United States Patent
Heisele et al.

(10) Patent No.: US 9,078,555 B2
(45) Date of Patent: Jul. 14, 2015

(54) DISHWASHER AND METHOD FOR OPERATING A DISHWASHER

(75) Inventors: Bernd Heisele, Sontheim (DE); Helmut Jerg, Giengen (DE); Michael Lugert, Jettingen-Scheppach (DE); Michael Georg Rosenbauer, Reimlingen (DE); Franz-Josef Wagner, Nördlingen (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 688 days.

(21) Appl. No.: 13/390,535

(22) PCT Filed: Aug. 23, 2010

(86) PCT No.: PCT/EP2010/062231
§ 371 (c)(1),
(2), (4) Date: Feb. 15, 2012

(87) PCT Pub. No.: WO2011/026752
PCT Pub. Date: Mar. 10, 2011

(65) Prior Publication Data
US 2012/0138102 A1 Jun. 7, 2012

(30) Foreign Application Priority Data
Sep. 2, 2009 (DE) .......................... 10 2009 029 115

(51) Int. Cl.
*B08B 9/093* (2006.01)
*A47L 15/42* (2006.01)
*A47L 15/00* (2006.01)
*A47L 15/48* (2006.01)

(52) U.S. Cl.
CPC ......... *A47L 15/4291* (2013.01); *A47L 15/0057* (2013.01); *A47L 15/481* (2013.01); *A47L 15/4221* (2013.01); *Y02B 40/44* (2013.01)

(58) Field of Classification Search
None
See application file for complete search history.

(56) References Cited

U.S. PATENT DOCUMENTS

| | | |
|---|---|---|
| 2007/0277854 A1 | 12/2007 | Eiermann et al. |
| 2008/0127997 A1 | 6/2008 | Jerg et al. |
| 2010/0258145 A1 | 10/2010 | Heissler et al. |

FOREIGN PATENT DOCUMENTS

| | | |
|---|---|---|
| WO | 2005053504 A1 | 6/2005 |
| WO | WO 2005063110 A2 * | 7/2005 |

OTHER PUBLICATIONS

International Search Report PCT/EP2010/062231, mailed Mar. 11, 2010.

* cited by examiner

*Primary Examiner* — Eric Golightly
(74) *Attorney, Agent, or Firm* — James E. Howard; Andre Pallapies

(57) ABSTRACT

A dishwasher includes a rinsing container having a rinsing chamber and a drying facility which is provided outside of the rinsing container and fluidically connected to the rinsing chamber for drying air charged with humidity from the rinsing chamber. A storage tank is fluidically connectable with the rinsing chamber for intermediately storing rinsing fluid.

25 Claims, 4 Drawing Sheets

DISHWASHER AND METHOD FOR OPERATING A DISHWASHER

BACKGROUND OF THE INVENTION

The invention relates to a dishwasher as claimed in the preamble of claim 1 and to a method for operating such a dishwasher as claimed in claim 17.

With dishwashers, reduced energy and time expenditure during the wash cycle at the same time as a high cleaning performance is of significant importance.

DE 10 2005 004 089 A1 discloses a generic dishwasher, with which in the wash cycle, instead of condensation drying with the aid of an external drying system, air drying takes place outside of the rinsing chamber. A sorption column with a reversibly dehydrogenizable material is provided as the drying facility, said material extracting a quantity of water from the air to be dried and storing the same. The thus dried air is then fed back into the rinsing chamber. A drying step which is shortened in comparison with condensation drying can take place in this way, accompanied by energy-savings. The dehumidification of the reversibly dehydrogenizable material of a sorption drying facility of this type usually takes place by means of an assigned electrical heating facility, in particular air heater, advantageously during at least one fluid-conveying partial wash cycle of a selected dishwasher program so that heated air can be routed from the sorption drying facility into the rinsing chamber of the dishwasher and can be used there to warm/heat up washing liquor, thereby being energy-efficient. The component outlay for the production of the dishwasher nevertheless increases with the provision of the external drying system.

BRIEF SUMMARY OF THE INVENTION

The object underlying the invention is to provide a dishwasher and a method for operating a dishwasher, in particular domestic dishwasher, the energy and/or water demand of which can be further reduced.

The object is achieved by a dishwasher, in particular a domestic dishwasher, having a drying facility provided outside of a rinsing container and fluidically connected to the rinsing chamber bounded by the rinsing container such that the drying facility can be used for drying air charged with high humidity from the rinsing chamber, wherein the dishwasher comprises a storage tank in which rinsing fluid can be intermediately stored. The object is also achieved by a method for operating a dishwasher, in which, in a drying step during a wash cycle, the air charged with humidity is guided into the drying facility by way of the common rinsing container opening, in which, in an desorption step during at least one partial wash cycle, the air is guided out of the rinsing chamber via the common rinsing container opening into the drying facility for dehumidifying its sorption material, in which, when filling or emptying the storage tank, a pressure balance takes place by way of the common rinsing container opening, and in which, with a storage tank cleaning, rinsing fluid is routed via the common rinsing container opening into the rinsing chamber.

The dishwasher also comprises a storage tank in which rinsing fluid can be intermediately stored during or after running a wash cycle. In this way, after running one of the partial program steps for instance, like a rinse-aid step, the rinsing fluid which is no longer needed is intermediately stored in the storage tank and reused in a subsequent wash cycle, like the pre-rinse step. The water and/or energy demand during a wash cycle can therefore be reduced by using the storage tank.

The storage tank can, like the drying facility too, be fluidically connected to the rinsing chamber bounded by the rinsing container. The rinsing container openings for siphoning off the air to be dried into the drying facility and a rinsing container opening to the storage tank are therefore needed.

The embodiment of two rinsing container openings which are separate from one another is however complicated in terms of manufacture. Furthermore, each of the openings is to be provided with corresponding fluid seals, which is technically very complicated. In an advantageous embodiment of the invention, both the storage tank and also the drying facility can therefore be fluidically connected to the rinsing chamber by way of a common rinsing container opening. A further rinsing container opening can thus be dispensed with. This in particular reduces the component outlay for the manufacture of the dishwasher, i.e. its construction is simplified. The common rinsing container opening is therefore assigned with a dual function both to the storage tank and also to the drying facility.

In this way, during the drying step, the air charged with significant humidity can for instance be conducted via the common rinsing container opening into the drying facility by means of a fan.

In addition to or regardless of this, in a desorption step during at least one fluid-conveying partial wash cycle, air can be guided out of the rinsing chamber via the common rinsing container opening into the drying facility in order to dehumidify its sorption material.

The storage tank can be filled with rinsing fluid in a rinse-aid step upstream of the drying step in a time-delayed fashion with respect to said drying step and/or emptied in order to implement the pre-rinse step. The pressure balance needed when filling or emptying the storage tank can take place in accordance with the invention by way of the common rinsing container opening.

In addition or alternatively, a storage tank cleaning can take place for instance within the scope of a wash cycle, in which the rinsing fluid is rinsed through the storage tank at a high temperature and at high pressure. As a result, fat deposits in the storage tank can be thermally broken down and guided out of the storage tank. In accordance with the invention, the cleaning fluid rinsed through the storage tank can be conducted into the rinsing chamber via the common rinsing container opening.

An intake duct can be connected between the external drying facility and the common rinsing container opening, via which intake duct the air charged with humidity is guided to the drying facility. In the intake duct, approximately at its downstream side ahead of the drying facility, a fan and/or a heating element can be provided in order on the one hand to guide air out of the rinsing chamber into the drying facility and on the other hand to heat this, in particular for a desorption process, i.e. dehumidification of its reversibly dehyrdrogenizable drying material, such as zeolite for instance.

As mentioned above, rinsing fluid is rinsed through the storage tank during the storage tank cleaning, said rinsing fluid entering the rinsing chamber via the common rinsing container opening. Encroachment of fluid into the drying facility is to be avoided here, in order in particular to keep its sorption material functional for a drying step of a selected dishwasher program. For safety reasons it is therefore advantageous if the intake duct expediently comprises a channel segment which is guided upwards above a predetermined head starting from the common rinsing container opening. The intake duct may also comprise in particular a second channel segment connected thereto, which is routed downwards in the opposite direction to the first channel segment.

The channel segment routed upwards above the head advantageously also provides a condensation path along which humidity can condense during the drying process, said moisture being fed back into the rinsing chamber in the fluid phase.

Similarly, it may be expedient for safety reasons if the storage chamber of the storage tank does not open directly into the common rinsing container opening. The storage chamber can therefore preferably be connected to the common rinsing container opening by way of an outlet duct.

The outlet duct expediently comprises an inlet opening which is connected to the storage chamber of the storage tank, in particular to the overflow opening of the storage tank. In order to completely exhaust the storage capacity, the outlet opening of the storage tank, which opens into the inlet segment of the outlet duct via its inlet opening, can be arranged in particular in an upper apex of the storage tank. As a result, a fill level of the fluid to be stored in the storage tank can be applied up to this apex without the fluid to be stored being able to drain off into the rinsing chamber by way of the outlet opening and the common rinsing container opening.

In the cleaning mode, the rinsing fluid can therefore be pumped into the storage tank through a fluid inlet and can be fed back into the rinsing container via the outlet opening of the storage tank and the outlet duct coupled, in particular molded thereto and the common rinsing container opening.

According to an advantageous development of the invention, the storage tank and/or the intake duct can be easily produced as plastic components which can in turn be manufactured using an injection molding method. By way of example, the storage tank or the intake duct may comprise two essentially congruent opposite side walls. The two opposite side walls may be fluidically connected to one another by way of a narrow peripheral edge flange, for instance by means of adhesion or welding.

According to an expedient development of the invention, both the storage tank and also the intake duct can be arranged on a rinsing container side wall for a space-saving arrangement. The storage tank may also be manufactured together with the intake duct in particular composed of a single material and/or in one piece as a standard injection molded part.

The storage tank and the intake duct can preferably be arranged so as to complement one another for optimal space usage on the outer side wall of the rinsing container. To this end, the storage tank may in particular be configured essentially L-shaped, namely with an in particular floor-facing container segment which extends lengthways in the depth direction and a container segment which protrudes vertically therefrom, which can extend up to the upper edge of the rinsing container side wall.

Free installation space is advantageously created between the two container segments which are arranged in an L shape, in which space is available in particular for the intake duct. In particular, its channel segment which is routed to the common rinsing container opening can run into the free installation space between the container segments.

The common rinsing container opening may preferably be arranged here at an inner corner region between the two container segments of the storage tank. The intake duct may in this way be routed past a free front side of the horizontal container segment with its afore-cited second channel segment in the opposite direction and run with its first container segment to the common rinsing container opening positioned at the inner corner region.

Other embodiments and developments of the invention are reproduced in the subclaims. The aforecited and/or advantageous embodiments and developments of the invention which are reproduced in the subclaims can be used here individually or also in any combination with one another in the inventive dishwasher and the inventive method.

BRIEF DESCRIPTION OF THE DRAWINGS

The invention, its embodiments and developments as well as its advantages are described in more detail below with the aid of drawings, in which.

DETAILED DESCRIPTION OF EXEMPLARY EMBODIMENTS OF THE PRESENT INVENTION

Figure 1:
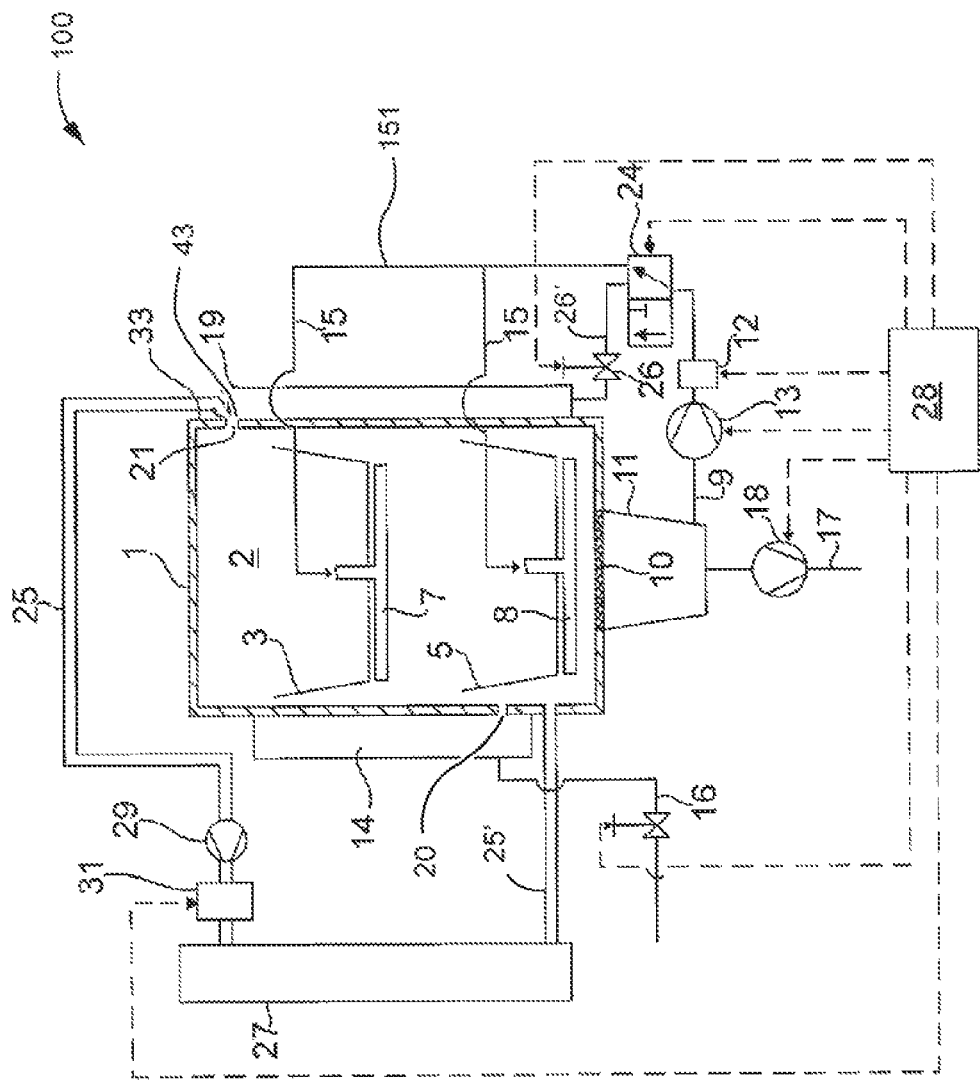
FIG. 1 shows a schematic block diagram of an advantageous exemplary embodiment of an inventively constructed dishwasher, and FIGS. 2 to 4 each show a sectional side view of the intake duct of the drying facility and of the storage tank of the dishwasher in FIG. 1 with different operating states.

A dishwasher 100, in particular domestic dishwasher, having a rinsing container 1 delimiting a rinsing chamber 2 is shown schematically in FIG. 1. An item to be rinsed (not shown) can be arranged in the racks 3, 5, in the rinsing chamber 2 of the rinsing container 1. In the rinsing container 1 shown, two spray apparatuses 7, 8, in particular rotating spray arms, are arranged by way of example in different spray planes, by way of which the item to be rinsed is subjected to rinsing fluid. A sump 11 with an only roughly sketched sieve arrangement 10 is provided in the rinsing container base. A circulating line 9 with a circulating pump 13 arranged therein is routed away from the sump 11. The circulating line 9 is fluidically connected to the spray arms 7, 8 by way of feed lines 15. A heating element 12 referred to as a water heater, for instance a continuous flow heater, is arranged downstream of the circulating pump 13. The sump 11 is also connected to a drain line 17 by way of connecting pieces, in which drain line 17 a drain pump 18 is arranged for pumping off rinsing fluid out of the rinsing container 1. In the exemplary embodiment, the circulating pump 13 can be coupled here to the supply line 26' of an externally arranged storage tank 19 and to one or several intake lines 151 for the one or several spray apparatuses 7, 8 by way of a water switch 24, in particular a 3-way valve. A locking valve 26 is inserted into the supply line 26'. The locking valve 26 is opened in order to fill the storage tank 19 with washing liquor fluid and closed in order to intermediately store fluid. The locking valve 26 is opened in order to empty the intermediately-stored washing liquor fluid into the rinsing chamber 2 of the wash tub 1 so that the washing liquor fluid can flow back into the sump 11 through the line 26' solely under gravitational effect.

The rinsing container 1 comprises a water inlet container 14 on its left side according to FIG. 1. This is connected to the rinsing chamber 2 by way of a rinsing container opening 20. Furthermore it opens into the water inlet container 14 with a fresh water feed line 16 which is coupled to the water supply network. A water softening system (not shown) is connected upstream of the water inlet container 14.

The rinsing container 1 comprises a so-called wash liquor store as a storage tank 19 on its right side in FIG. 1. This may if necessary be thermally insulated against the side wall 33 of the rinsing container 1. Rinsing fluid can be intermediately stored in the wash liquor store 19, which is no longer needed after running a partial program segment of a wash cycle and can be partially or wholly used for a rinsing bath in a wash cycle of a subsequently started dishwasher program. The wash liquor store 19 is fluidically connected to the rinsing chamber 2 in its upper region by way of an outlet opening 43, in particular overflow opening, which opens into a rinsing container opening 21.

In the exemplary embodiment in FIG. 1, the storage tank 19 comprises an outlet opening 43, which opens into the rinsing container opening 21, on its upper side. To this end, an outlet duct 41 leads from the outlet opening 43 to the rinsing container opening 21. For the sake of clarity in terms of the drawings, this outlet duct 41 was omitted from FIG. 1. It is shown in detail in FIGS. 2 to 4. According to an alternative embodiment variant it may naturally also be expedient to omit the outlet duct 41. The outlet opening 43 of the storage tank 19 is then expediently provided in the vicinity of the common rinsing container opening 21. This is simultaneously connected to the intake duct 25 of a drying facility 27 embodied as a sorption column. A fan 29 and a heating element 31 are connected to the drying facility 27 in the intake duct 25. The drying facility 27 contains a reversible dehydrogenizable material as a drying material, e.g. zeolite, with which air is dried in a drying step. To this end, an air flow charged with high humidity is siphoned off from the rinsing chamber 2 of the rinsing container 1 by means of the fan 29 via the common rinsing container door opening 21 and is routed into the drying facility 27 by way of the intake duct 25. The sorption material, like zeolite, provided in the drying facility 27 absorbs moisture from the air and the comparatively dry air is fed back into the rinsing container 1 in the on sorption drying facility 27 by way of an air duct 25' on the output side. The quantity of water stored in the zeolite in the drying step can be released again in a regeneration and/or desorption process (not shown in more detail here).

Figure 2:
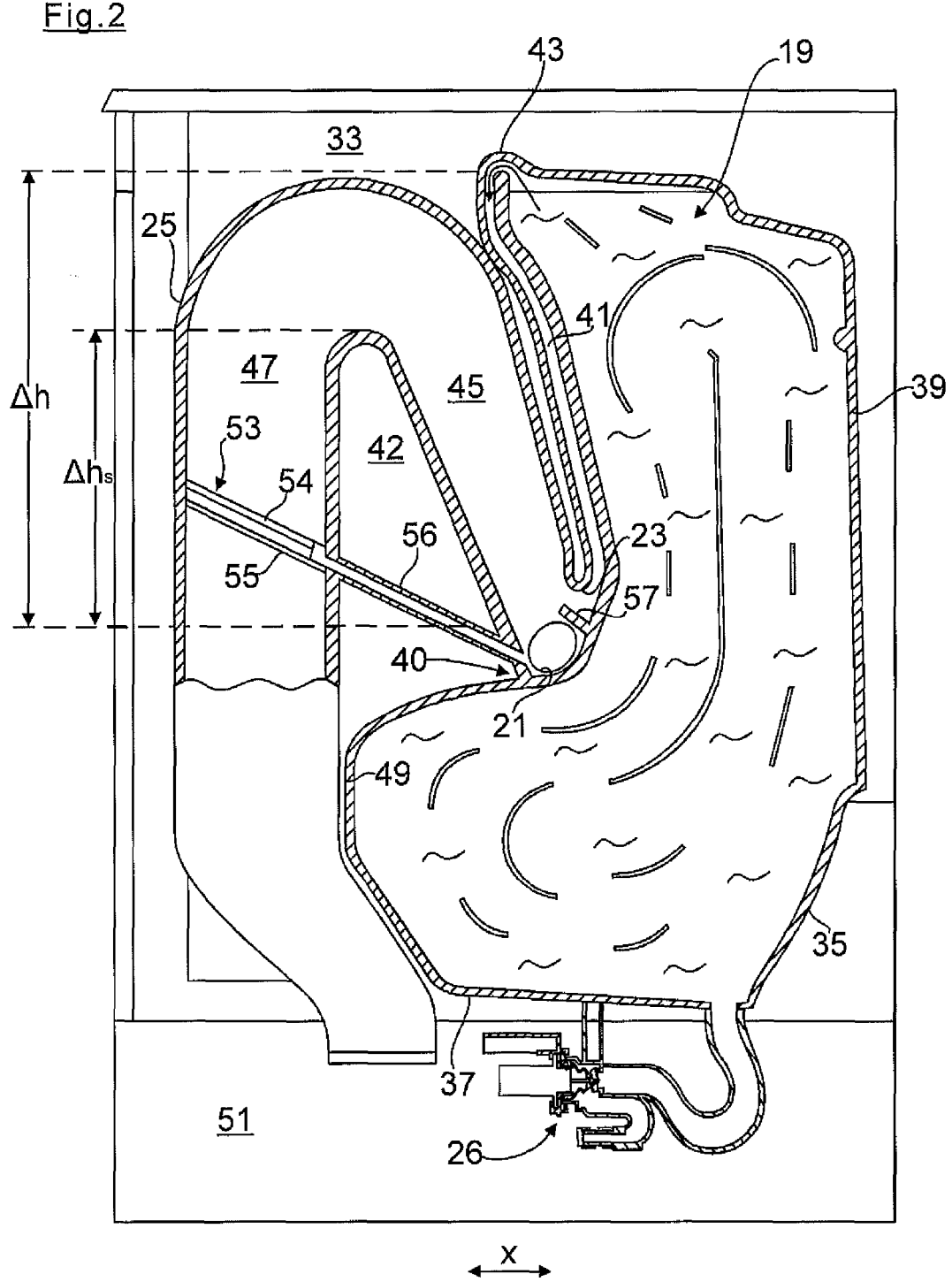

As apparent from FIG. 2, both the intake duct 25 and also the storage tank 19 are provided on the outside side wall 33 of the rinsing container 1. Accordingly, both the intake duct 25 and also the storage tank 19 are in contact with the rinsing container side wall 33. The intake duct 25 and the storage tank 19 are manufactured in one piece as a component made of plastic material using a plastic injection molding method. Each comprise congruent side walls, of which only the side wall located in contact with the rinsing container side wall 33 is shown in FIG. 2. The intake duct 25 and the storage tank 19 also comprise a peripheral edge flange 35, which may be connected to the opposite side wall (not shown) using welding.

As is further apparent from FIG. 2, the component assembly consisting of intake duct 25 and storage tank 19 essentially takes up the entire surface of the rinsing container side wall 33. The storage tank 19 and the intake duct 25 are embodied to complement one another for a space-saving arrangement. The storage tank 19 is configured essentially L-shaped, namely with a floor-facing elongated container segment 37 in the depth direction x (with respect to the rinsing chamber 2) and a container segment 39 which protrudes vertically therefrom, which extends up to the top side of the dishwasher.

The common rinsing container opening 21 is arranged in the inner corner region 40 between the two container segments 37 and 39. The common rinsing container opening 21 is connected via an essentially vertically raised, in particular integrated outlet duct 41 provided in or on the storage tank 19, said outlet duct 41 being connected to the outlet opening 43 of the storage tank 19 by way of an inlet segment on the input side. This is embodied in particular as an overflow opening. The storage chamber of the storage tank 19 opens into the outlet duct 41 via this. The outlet opening 43 according to FIG. 2 is arranged in particular on an upper apex of the storage tank 19 as an overflow opening and is arranged above the common washing container opening 21 above a height difference $\Delta h$.

Starting from the common rinsing container opening 21, a first channel segment 45 of the intake duct 25 on the air inlet side extends obliquely upwards to the front above a head $\Delta hs$, as a result of which a condensation path which rises obliquely upwards is provided. The intake duct 25 with a second channel segment 47 is then routed vertically downwards opposite to the first channel segment 45.

For as close and compact an arrangement of the intake duct 25 and storage tank 19 as possible, these are embodied to complement one another. The two container segments 37, 39 bound an installation space 42, in which the channel segment 45 of the intake duct 25 runs. The second channel segment 47 of the intake duct 25 which leads vertically downwards is also routed frontally past a front face 49 of the lower container segment 37 of the storage tank 19 in the depth direction x until reaching an assembly space 51 provided below the washing container 1, in which the drying facility 27 is arranged together with the heating element 21 and the fan 29.

As apparent from FIG. 2, a fluid droplet separator 53 is provided in the second channel segment 47 of the intake duct 25 which comprises tilted discharging ribs 54, 55. Fluid droplets condensed on the inner wall of the channel segment 47 are caught with the discharging ribs 54, 55 and routed back into the channel segment 45 via a return duct 56. The fluid droplets can be routed from there via the common rinsing container opening 21 into the rinsing chamber 2. In particular, in the exemplary embodiment, the return duct 56 opens here directly into the common rinsing container opening 21.

According to FIG. 2, the intake duct 25 is connected in one piece with the inner corner region of the storage tank 19 with its first channel segment 45. The first channel segment 45 is connected here to the outlet opening 23 on the lower region of the outlet duct 41.

Subsequently, the design and mode of operation of the assembly consisting of intake duct 25 and storage tank 19 with the common rinsing container opening 21 are described on the basis of different operating states of the dishwasher.

The storage tank 19 in FIG. 2 is therefore shown with an intermediately stored rinsing fluid. The fill level is limited here by a lower edge of the outlet opening 43. The filling of the storage tank 19 can be implemented during a wash cycle during and/or after an effected rinse-aid step. To this end, the rinse-aid fluid which is no longer needed during and/or after the conclusion of the rinse-aid step is not pumped off by means of the drain pump 18 of the dishwasher 100, but is instead pumped into the storage tank 19 by means of its circulating pump 13 via the water switch 24 and via the unlocked locking valve 26 in the feed line 26'. The locking valve 26 is then closed again. The storage tank 19 is filled here under a pressure balance, which takes place via the outlet opening 43, the outlet duct 41 and the common rinsing container opening 21.

A pressure balance similarly takes place during the emptying of the storage tank 19. In order to empty the storage tank 19, the locking valve 26 in the feed line 26' is opened and the flow path to the sump 11 is unlocked. The intermediately stored rinsing fluid may therefore flow back into the sump 11 under gravitational effect and be used to implement a pre-rinse step.

Figure 3:
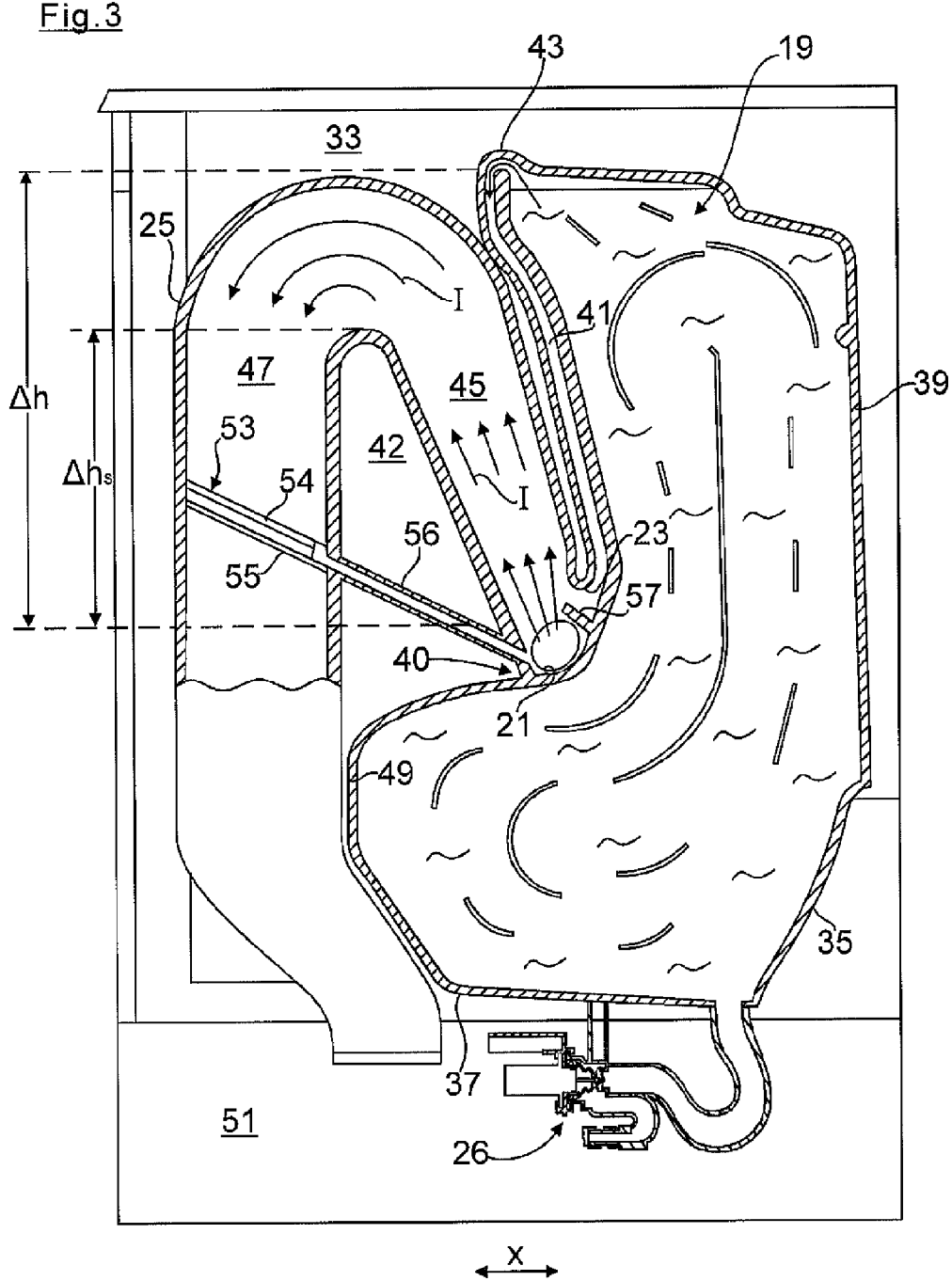

According to FIG. 3, the air flow I is shown, which is siphoned off out of the rinsing chamber 2 during a drying step at the end of the wash cycle. The air flow I charged with high humidity is guided out of the rinsing chamber 2 by means of the fan 29 through the rinsing chamber opening 21 and the intake duct 25 connected thereto to the sorption column 27, in which moisture is taken from the air flow I. Since the dehumidified air is at the same time fed back into the rinsing chamber 2, the air circuit during the drying step takes place at approximately normal pressure without larger pressure fluctuations so that there is no risk of taking in rinsing fluid which has been intermediately stored in the storage tank 19.

Figure 4:
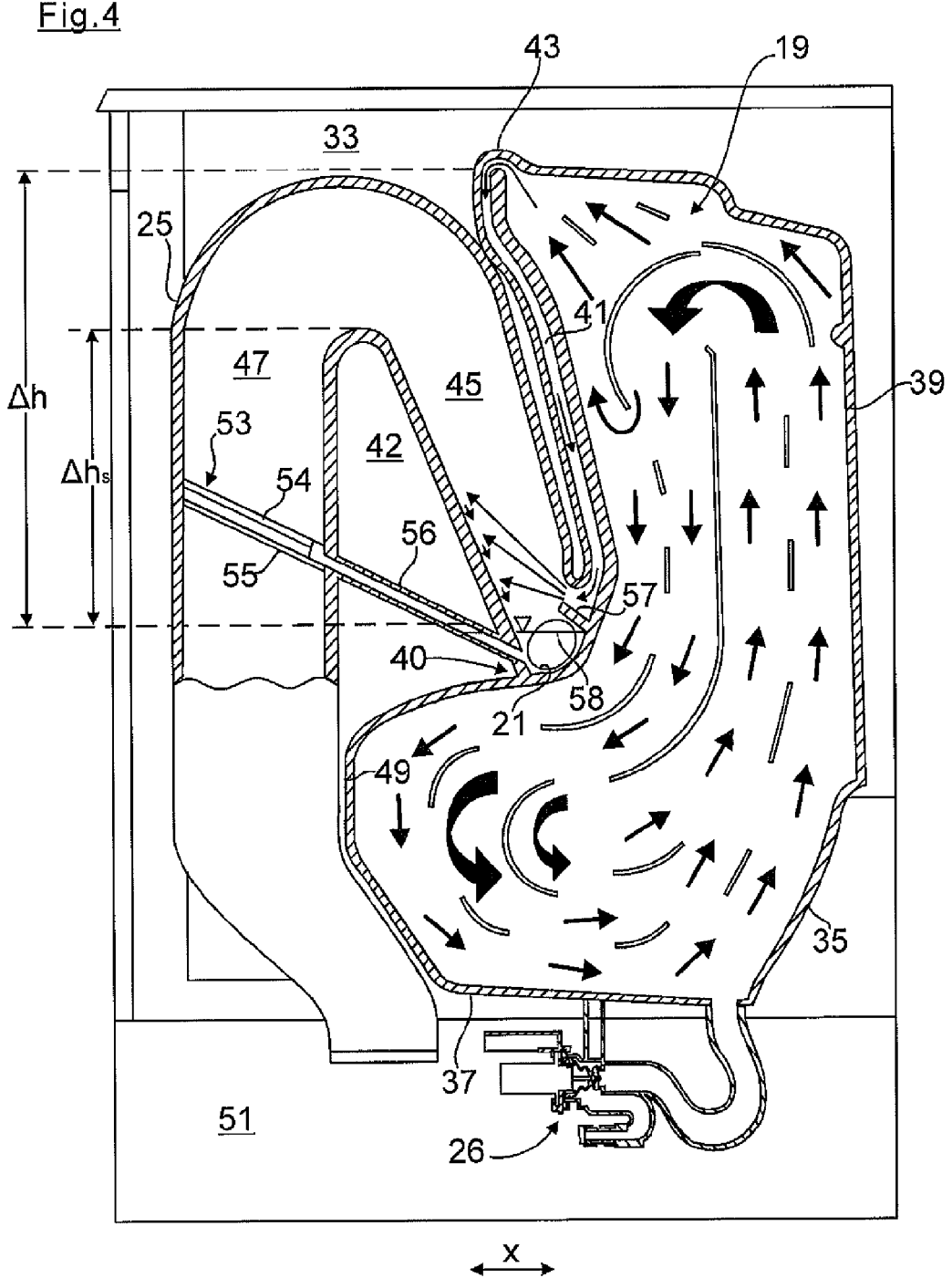

FIG. 4 shows the cleaning mode in order to clean the storage chamber of the storage tank 19. In order to implement the storage tank cleaning, the rinsing fluid is pumped by the circulating pump 13 at high flow speed into the storage tank 19 via the feed line 26' with an open locking valve 26. This flows through the storage tank 19 in the manner of an annular flow. The rinsing fluid is guided via the upper outlet opening 43 and the outlet duct 41 connected thereto to the common rinsing container opening 21, by way of which the rinsing fluid can be reintroduced into the rinsing chamber 2. The rinsing fluid can in this way circulate between the rinsing chamber 2 and the storage tank 19 in a closed circulation circuit. At the same time, the rinsing fluid in the circulating circuit is heated to temperatures in the order of magnitude of 70° C., as a result of which dirt particles within the storage tank 19 can be released and discharged.

It is highly important during the cleaning mode for the fluid flow conveyed out of the storage tank 19 via the outlet opening 43 embodied in particular as an overflow opening and via the outlet duct 41 connected thereto not to be able to reach the channel segment 47 via the return duct 56 and from there to drain off to the drying facility 27. To prevent this, a deflection rib 57 is provided downstream of the outlet duct 41 in the merging region of the common rinsing container opening 21, with which the fluid flow to the inner wall of the intake duct 25 is guided above the return duct opening and cannot flow directly into the return duct 58. A fill level 58 in the lower bottom area of the outlet duct 41 thus ensues, whereby the return duct 56 is only filled with fluid to a minimal degree.

LIST OF REFERENCE CHARACTERS

1 Rinsing container
2 Rinsing chamber
3, 5 Racks
7, 8 Spray apparatuses
9 Circulating line
10 Sieve arrangement
11 Sump
12 Heating element
13 Circulating pump
14 Water inlet container
15 Feed lines
16 Fresh water feed line
17 Drain line
18 Drain pump
19 Wash liquor store
21 Common rinsing container opening
23 Outlet opening
24 Three-way switching valve
25 Intake duct
25' Air duct
26 Locking valve
26' Supply line
27 Drying facility
28 Control facility
29 Fan
31 Heating element
33 Rinsing container side wall
35 Peripheral edge
37 Horizontal container segment
39 Vertical container segment
40 Inner corner region
41 Outlet duct
42 Installation space
43 Outlet opening
45 First channel segment of the intake duct 25
47 Second channel segment of the intake duct 25
51 Assembly space
53 Droplet separator
54,55 Discharging ribs
56 Return duct
57 Deflection rib
58 Fill level
$\Delta h_s$ Head
$\Delta h$ Height difference
x Depth direction
I Air
100 Dishwasher
151 Intake lines

The invention claimed is:

1. A dishwasher, comprising:
a rinsing container having a rinsing chamber;
a drying facility provided outside of the rinsing container and fluidically connected to the rinsing chamber for drying air charged with humidity from the rinsing chamber; and
a storage tank fluidically connectable with the rinsing chamber for intermediately storing rinsing fluid,
wherein the rinsing container has a common rinsing container opening for fluidically connecting both the storage tank and the drying facility to the rinsing chamber.

2. The dishwasher of claim 1, constructed in the form of a domestic dishwasher.

3. The dishwasher of claim 1, further comprising a fan for guiding in a drying step during a wash cycle, the air charged with humidity into the drying facility by way of the common rinsing container opening.

4. The dishwasher of claim 1, wherein the storage tank is filled with rinsing fluid or emptied in the presence of a pressure balance by way of the common rinsing container opening.

5. The dishwasher of claim 1, wherein the storage tank is cleaned by rinsing the storage tank with rinsing fluid, with the rinsing fluid rinsed through the storage tank being conducted into the rinsing chamber by way of the common rinsing container opening.

6. The dishwasher of claim 1, further comprising an intake duct connected between the drying facility and the common rinsing container opening for conducting air charged with humidity to the drying facility.

7. The dishwasher of claim 6, wherein the intake duct comprises a first channel segment, which is routed upwards starting from the common rinsing container opening above a head.

8. The dishwasher of claim 7, wherein the intake duct comprises a second channel segment which connects to the first channel segment and is fed downwards in an opposite direction to the first channel segment.

9. The dishwasher of claim 1, further comprising an outlet duct connecting a storage chamber of the storage tank to the common rinsing container opening.

10. The dishwasher of claim 9, wherein the outlet duct comprises an input opening, which is connected to the storage chamber of the storage tank, and which is arranged above the common rinsing container opening above a height difference.

11. The dishwasher of claim 10, wherein the input opening is configured as an overflow opening.

12. The dishwasher of claim 9, wherein the outlet duct and the storage tank are embodied as a structural unit in at least one of two ways, a first way in which the outlet duct and the storage tank are composed of a single material, and a second way in which the outlet duct and the storage tank are embodied in one piece.

13. The dishwasher of claim 12, wherein the outlet duct and the storage tank are embodied as a plastic injection molded part.

14. The dishwasher of claim 6, wherein the storage tank is arranged together with the intake duct on a side wall of the rinsing container.

15. The dishwasher of claim 6, wherein at least one of the storage tank and the intake duct comprises two essentially congruent side walls, which are fluidically connected to one another by way of peripheral edges.

16. The dishwasher of claim 6, wherein the storage tank and the intake duct are embodied so as to complement one another.

17. The dishwasher of claim 1, wherein the storage tank has an essentially L-shaped configuration and includes a first container segment extended in a depth direction and a second container segment protruding vertically from the first container segment.

18. The dishwasher of claim 17, wherein the first container segment is arranged in an area of a floor of the storage tank.

19. The dishwasher of claim 17 further comprising an intake duct connected between the drying facility and the common rinsing container opening for conducting air charged with humidity to the drying facility, said first and second container segments delimiting an installation space outside of the L-shaped storage tank, in which the intake duct runs.

20. The dishwasher of claim 19, wherein the intake duct has a channel segment which runs in the installation space and is routed to the common rinsing container opening.

21. The dishwasher of claim 17, wherein the common rinsing container opening is arranged on an inner corner region between the first and second container segments of the storage tank.

22. The dishwasher of claim 19, wherein the first container segment extends horizontally, said intake duct running past a front face of the first container segment.

23. The dishwasher of claim 22, wherein the intake duct comprises a first channel segment, which is routed upwards starting from a common rinsing container opening of the rinsing chamber for fluidically connecting both the storage tank and the drying facility to the rinsing chamber, and a second channel segment routed opposite to the first channel segment.

24. The dishwasher of claim 23, wherein the second channel segment is routed into an assembly space below the rinsing container.

25. A method for operating a dishwasher, the method comprising:
guiding, in a drying step during a wash cycle, air charged with humidity into a drying facility by way of a common rinsing container opening of a rinsing chamber for fluidically connecting a storage tank and the drying facility to the rinsing chamber;
guiding, in an desorption step during at least one partial wash cycle, the air out of the rinsing chamber via the common rinsing container opening into the drying facility for dehumidifying sorption material in the drying facility;
establishing a pressure balance, when filling or emptying the storage tank, by way of the common rinsing container opening; and
cleaning a storage tank by routing a rinsing fluid via the common rinsing container opening into the rinsing chamber.

* * * * *